Oct. 21, 1924.
J. LOVE
HAIR CLIPPER
Filed Aug. 6, 1923
1,512,777
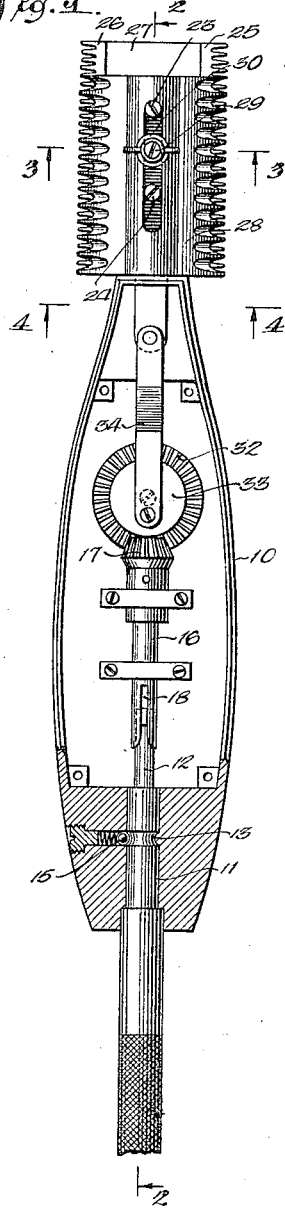
WITNESSES
INVENTOR
JACK LOVE
BY
ATTORNEYS Patented Oct. 21, 1924.

1,512,777

UNITED STATES PATENT OFFICE.

JACK LOVE, OF HURON, SOUTH DAKOTA.

HAIR CLIPPER.

Application filed August 6, 1923. Serial No. 656,062.

*To all whom it may concern:*

Be it known that I, JACK LOVE, a citizen of the United States, and a resident of Huron, in the county of Beadle and State of South Dakota, have invented new and useful Improvements in Hair Clippers, of which the following is a full, clear, and exact description.

This invention relates to hair clippers.

The general object of the invention is the provision of a simply constructed and durable power driven hair clipper provided with cutting plates that may be used for cutting in either direction without reversing its position.

A further object of the invention is the provision of a hair clipper, the bottom cutting plate of which is curved so as to provide a means for guiding the clipper by rocking it on the body being operated upon.

These objects are accomplished by mounting on a casing made in the form of a handle and in alinement with it a bottom cutting plate having a curved lower face and teeth on both sides, slidably mounting on said bottom cutting plate a top cutting plate having teeth on both sides, and mounting in the handle means for giving the top cutting plate a sliding motion on the bottom cutting plate.

These and other objects of the invention will be more clearly understood from the following detailed description and accompanying drawings:

Figure 1 is a top plan view of the clipper with a portion of the casing cut away, showing its construction;

Figure 2 is a vertical longitudinal section along the line 2—2, Figure 1, showing its construction;

Figure 3 is a vertical transverse section along the line 3—3, Figure 1, showing the contour of the cutting plates;

Figure 4 is a cross section along the line 4—4, Figure 1;

Figure 5 is a top plan view of a modification of the cutting plates.

Referring to the above-mentioned drawings, the invention includes a two-section casing 10 made in the form of a handle and clamped together by screws 14. Formed in the lower end of the casing is an opening 11 for receiving a flexible shaft 12. This flexible shaft 12 has a circumferential opening 13 formed therein for receiving a spring controlled ball 15 mounted in the handle for locking the flexible shaft in position in the base of the handle or casing 10. Rotatably mounted in bearings fixed in the casing is a drive shaft 16. Mounted on the upper end of the drive shaft 16 is a bevel gear 17. The lower end of the drive shaft 16 has a slot 18 cut therein for receiving the inner end of the flexible shaft 12.

A bottom cutting plate 20 having a plurality of teeth on each side has formed on one end a tongue 21 shaped for fitting into a dovetailed groove. Formed in the upper end of the casing or handle 10 is a dovetailed groove 19 shaped for receiving the tongue 21. The tongue 21 is retained in position in the dovetailed groove 19 by means of screws 22. In forming the bottom cutting plate 20, machined surfaces 25 and 26 are provided along the base of the teeth while the center is cut away as shown at 27. Mounted in the plate 20 are two spaced guides 23 and 24. A top cutting plate 28 having teeth on both sides and a longitudinal slot in its center is slidably mounted on the bottom cutting plate 20, the slot receiving the guides 23 and 24. These plates are clamped together by means of a stud and wing nut 29 and a spring washer 30.

The top cutting plate 28 is driven from the main drive shaft 16. The motion of the drive shaft is conveyed through a bevel gear 32 rotatably mounted on a bearing 31 formed integral with the wall of the casing 10 and meshing with the bevel gear 17 mounted on the end of the shaft 16. Formed integral with this gear 32 is an eccentric disk 33 connected to the plate 28 by a rod 34.

Referring to Figure 5, a modified construction of the cutting plates 20 and 28 is shown. In this case cutting plates are formed with teeth on one side only. The bottom plate has its lower face curved as shown in Figure 3 providing a means for guiding the operation of the clipper.

The operation of the device is as follows:

The flexible shaft 12 is projected through the opening 11 in the bottom of the casing 10 into the slot 18 provided in the lower end of the drive shaft 16. The motion of the drive shaft 16 is conveyed through the bevel gear 17, bevel gear 32, eccentric disk 33, rod 34 to the top cutting plate 28, giving the latter a reciprocating motion. When the clipper is in operation it will cut when moved in either direction. By rocking the clipper on the bottom cutting plate 20 the cutting teeth may be supported at different distances from any object.

I would state in conclusion that while the illustrated examples constitute practical embodiments of my invention I do not limit myself strictly to the exact details herein illustrated since manifestly the same can be considerably varied without departing from the spirit of the invention as defined in the appended claim.

Claim.

The combination with a hollow handle adapted to contain lubricant, a conical post in the handle, a gear wheel having a conical bearing receiving the post, a screw projected through the gear wheel and connecting the same to the post, a crank pin on the gear wheel, a link operatively connected to the crank pin, a power shaft projecting through one end of the handle, and a pinion on the shaft meshing with said gear wheel.

JACK LOVE.